Figure 1:
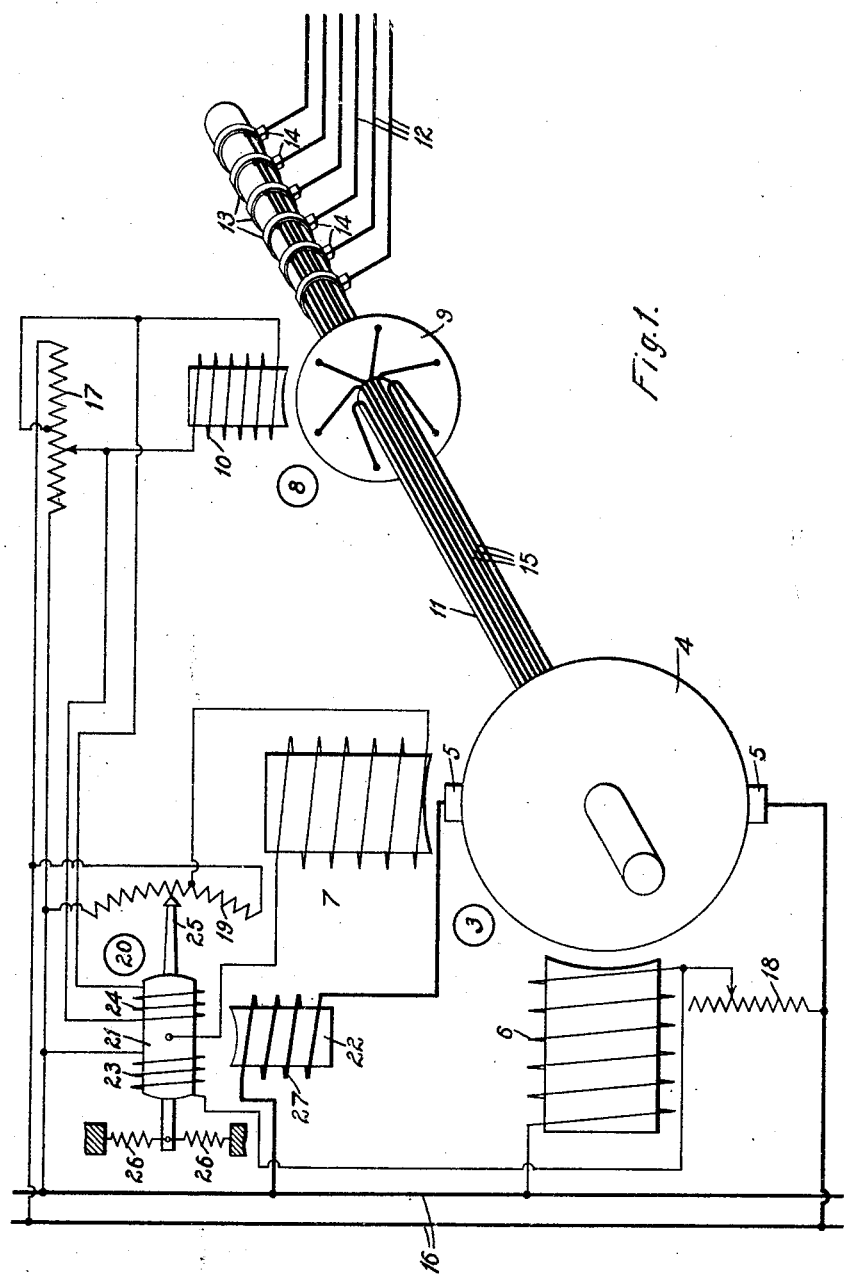

J. A. KUYSER.
EXCITING SYSTEM FOR BOOSTER INTERPOLE ROTARY CONVERTERS.
APPLICATION FILED OCT. 21, 1916.

1,284,369.

Patented Nov. 12, 1918.
2 SHEETS—SHEET 1.

WITNESSES:

INVENTOR
Jan Arthur Kuyser.
BY
ATTORNEY

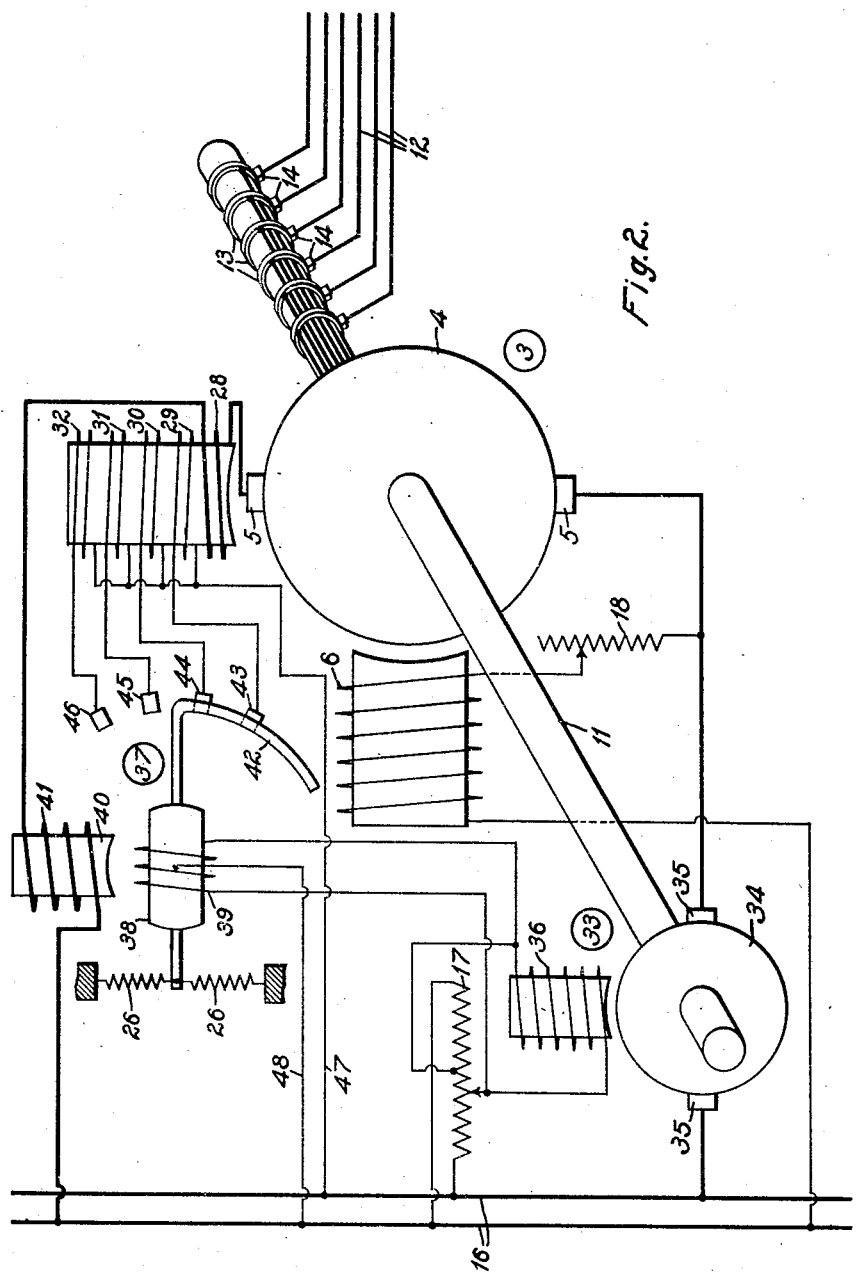

UNITED STATES PATENT OFFICE.

JAN ARTHUR KUYSER, OF SALE, ENGLAND, ASSIGNOR TO WESTINGHOUSE ELECTRIC AND MANUFACTURING COMPANY, A CORPORATION OF PENNSYLVANIA.

EXCITING SYSTEM FOR BOOSTER INTERPOLE ROTARY CONVERTERS.

1,284,369.   Specification of Letters Patent.   Patented Nov. 12, 1918.

Application filed October 21, 1916. Serial No. 126,918.

*To all whom it may concern:*

Be it known that I, JAN ARTHUR KUYSER, a subject of the Queen of Holland, and a resident of Sale, in the county of Chester, England, have invented a new and useful Improvement in Exciting Systems for Booster Interpole Rotary Converters, of which the following is a specification.

My invention relates to systems of excitation for rotary converters of the booster interpole type and similar apparatus, and it has for its object to provide a system whereby the interpole of a converter of the character designated may be properly excited, under all conditions of load, so that substantially sparkless commutation shall be obtained.

In the accompanying drawings, Figure 1 is a diagrammatic view of a synchronous booster, interpole rotary converter, together with associated supply, load and exciting circuits and associated apparatus, constructed in accordance with a preferred form of my invention; and Fig. 2 is a diagrammatic view of a similar system, embodying my invention as applied to a rotary converter of the direct-current booster, interpole type, other elements of the system being slightly modified from the form indicated in Fig. 1, as will hereinafter more fully appear.

It is a well-known fact that, in the operation of a rotary converter of the booster type, the booster machine acts as a generator when boosting, being driven by the armature of the rotary converter acting as a motor. In like manner, during bucking operation, the booster machine acts as a motor and tends to drive the armature of the rotary converter as a generator.

It is further well-known that the net or average armature reaction around the commutator of a rotary converter is a motor reaction. This is obvious from a consideration of the fact that, in a frictionless machine, the direct-current and alternating-current reactions would tend to be equal and opposite; but friction, windage, and iron and copper losses must be supplied by the alternating-current supply and, therefore, the alternating-current reaction tends to slightly exceed the direct-current reaction producing the resultant motor reaction, as described.

Careful investigation, however, has disclosed the fact that the reaction under the brushes of the commutator of a rotary converter is a generator reaction, as fully discussed in an article by B. G. Lamme and F. D. Newbury, entitled "Interpoles in Synchronous Converters" appearing on page 1624 et seq. of the Transactions of the American Institute of Electrical Engineers for 1910 (Part II).

Taking into account all of the above-mentioned factors, it will be noted that, during bucking operation, the effect of the generator reaction set up in the rotary-converter armature by the booster machine is added to the normal generator reaction under the brushes, producing a strong generator reaction in the commutating zone. On the other hand, during boosting operation, the motor reaction produced in the rotary-converter armature by the booster machine tends to neutralize the normal generator reaction under the brushes and may even reverse the same, producing a motor reaction in the commutating zone.

In attempting to neutralize the armature reaction in the commutating zone by means of interpoles, it is necessary to so excite said interpoles as to take into account all of the above-mentioned factors, that is to say, the interpole should be excited jointly in accordance with the load of the rotary converter, effective in producing the normal generator reaction under the brushes, and in accordance with the energy conversion in the booster machine in order to compensate for the additional motor or generator field produced in the commutating zone by the booster machine.

As I shall use the above term "energy conversion" in connection with the booster machine quite frequently in the disclosure and claims of this application, a word in explanation thereof is fitting. As before pointed out, during boosting operation, the booster machines operate as a generator, converting mechanical energy supplied thereto by the mechanical drive into electrical energy, and, conversely, during bucking operation, the booster machine operates as a motor, converting electrical energy supplied thereto from the system into mechanical energy which is returned to the system through the shaft of the booster machine and the driving mechanism. Thus, the term "energy conversion" covers broadly the activity of the booster machine during either the boosting or the bucking operation.

Referring to the drawing for a more detailed understanding of my invention, I show a rotary converter at 3 in Fig. 1. Said machine comprises an armature 4 provided with a commutator cylinder upon which bear brushes 5—5 and further provided with a main or exciting field winding 6 and with an interpole or commutating field winding 7.

A booster machine of the alternating-current synchronous type is shown at 8 and comprises an armature 9 and a field winding 10. The armature 9 is mechanically coupled to the armature 4 of the main machine by a shaft 11, as shown.

Alternating current for the operation of the system is derived from any suitable source by mains 12—12, shown, in this case, as six in number, as would be derived from the ordinary diametrally connected three-phase transformers, and flows to the armature 9 through suitable slip rings 13—13 and brushes 14—14. After passing through the booster-armature winding, the energy is fed to the main armature 4 by means of suitable leads 15—15 that are preferably mounted directly on the shaft 11 to rotate therewith.

Direct-current energy derived from the armature 4 flows through the brushes 5—5 to appropriate direct-current load mains 16—16.

The field winding 10 of the booster machine 8 is energized from the mains 16 or from any other appropriate direct-current source through a reversing rheostat 17 and, by the appropriate adjustment of said rheostat, the degree of buck or of boost of the machine 8 may be adjusted as is desired for the particular circumstances of operation.

The exciting field winding 6 of the main machine 3 is connected between the mains 16, and the current flowing therein may be adjusted by a suitable resistor 18.

The interpole or commutating field winding 7 of the machine 3 is connected to be energized from the direct-current mains 16 through a reversing rheostat 19, the adjustment of which is effected by means of a torque motor 20 comprising a rotor member 21 and a stator member 22. The rotor member 21 is provided with two windings 23 and 24, the former of which is connected in parallel with the field winding 6 and the latter in parallel with the exciting field winding 10 of the booster machine 8. The rotor member 21 carries a contact member 25 for coaction with the resistor 19 and is biased to the mid position by any suitable means, such, for example, as springs 26—26. The stator member 22 is provided with a winding 27 which is traversed by the load current flowing from the main armature 4, or, if desired, by a definite portion of said load current obtained by a current shunt or equivalent means, as is well known in the art.

Having thus described the arrangement of a system embodying my invention, the operation is as follows: assume the rotary converter 3 and the auxiliary machine 8 to be operating in the normal manner, transferring energy from the alternating-current mains 12 to the direct-current mains 16. The energization of the stator winding 27 of the torque motor 20 varies with the load current of the machine 3, and the excitation of the rotor winding 23 of the torque motor 20 varies substantially with the voltage of the machine 3 so that the torque developed by the interaction of said two windings is proportional to the load or output of the main machine 3 and is thus proportional to the normal generator reaction under the brushes 5—5 thereof. The winding 23 might well be connected directly between the mains 16, but it is obvious that the voltage between said mains 16 varies widely between boosting and bucking operation in the machine 8, and, as it is usual to compensate for the effects of this voltage variation upon the exciting field of the main machine 3 by the adjustment of the resistor 18, a more desirable excitation of the field winding 23 is obtained by so arranging the connections that it also may benefit by the adjustment of the resistor 18.

Turning again to the operation of the torque motor 20, the winding 24 is energized, both in magnitude and in direction of flow of the exciting current, in accordance with the setting of the resistor 17, thus being also in accordance with the excitation of the field winding 10 of the booster machine and also of the voltage of the booster machine when operating below saturation. The stator winding 27 of the torque motor 20, being energized in proportion with the load current of the rotary converter, is also energized in accordance with the load current of the booster machine 8 and, thus, the interaction between the windings 24 and 27 is proportional to the product of the voltage and current of the booster machine 8, or, in other words, is proportional to the watt input or output or to the "energy conversion" of the booster machine.

The connections are such that, during bucking operation, the torques produced by the interaction of the windings 23 and 27 and 24 and 27 are in the same direction, thus producing considerable angular movement of the rotor 21 against the restraining force of the springs 26, moving the contact member 25 far from the center of the resistor 19 and imposing a relatively large excitation voltage upon the interpole field winding 7 of the machine, as is necessary for the neutraliaztion of the strong generator reaction under the brushes during the specific conditions of operation indicated.

In like manner, during boosting operation, the torque produced by the windings 24 and 27 is opposed to that produced by the windings 23 and 27, and, consequently, but little movement of the rotor member 21 is produced, resulting in but slight excitation of the interpole field winding 7, as is necessary for the neutralization of the relatively weak generator reaction under the brushes during boosting operation. It will be observed that sufficient downward movement of the contact member 25 reverses the direction of current flow through the field winding 7, thus producing a suitable commutating flux for the neutralization of the motor reaction under the brushes obtaining under conditions of extreme boost.

Referring to the form of my invention shown in Fig. 2, the main rotary converter 3 comprises an armature 4 and brushes 5—5, as indicated heretofore, together with an exciting field winding 6. The interpole excitation, however, is produced by a series-connected field winding 28 and by a plurality of auxiliary field windings 29, 30, 31 and 32. A booster machine 33, of the direct-current type, is mounted on the shaft 11 of the rotary converter and comprises an armature 34 provided with brushes 35—35 and with an exciting field winding 36. Energy derived from the mains 12, after flowing through the armature 4 of the main machine and out at the brushes 5, also flows through the armature 34 of the booster machine 33. The exciting field winding 36 of the booster machine 33 is excited from the mains 16 through a reversing rheostat 17.

A torque motor 37 is provided for the energization of the auxiliary field windings of the main interpoles and comprises a rotor 38 provided with a winding 39 and a stator 40 provided with a winding 41 through which flows the load current of the rotary converter, after traversing the field winding 28. The winding 39 of the rotor 38 is connected in parallel with the booster field winding 36 and develops a torque in conjunction with the stator winding 41. The rotor 38 is normally biased to the mid-position by springs 26—26 and carries a contact member 42 adapted to make contact successively with fixed contact members 43 to 46, inclusive, connected respectively to corresponding terminals of the auxiliary field windings 29 to 32, inclusive, of the rotary converter interpole. The remaining terminals of said auxiliary field windings are connected to one of the direct-current mains 16 by a suitable lead 47, and the contact member 42 of the torque motor 37 is similarly connected to the other direct-current main 16 by a lead 48.

Having thus described the arrangement of the system of Fig. 2, the operation is as follows: The commutating field for the neutralization of the normal reaction under the brushes, varying with the rotary converter load, is provided by the series-connected, load-current-energized commutating field winding 28. The energization of the rotor winding 39 of the torque motor 37 and the attendant energization of the stator winding 41 of said torque motor in accordance with the load current of the rotary converter, corresponding to the load current of the booster machine, results in the production of a torque within the torque motor 37 proportional to the "energy conversion" of the booster machine 33. As said energy conversion increases in amount, during bucking, the contact member 42 is moved upwardly more and more against the restraining action of the springs 26 and successively energizes the contact members 43 to 46, inclusive, successively cutting in more and more of the auxiliary field interpole windings 29 to 32, inclusive, and increasing the commutating field, as is desired under conditions of heavy buck. The converse action takes place during boosting.

I have not deemed it necessary to illustrate the connections appropriate for the proper energization of the interpole during those conditions of extreme boost when the reaction under the brushes becomes a motor reaction, as said conditions are more or less unusual, but obviously, if desired, the system of Fig. 2 might readily be adapted to cover this range of operation by reversing the direction of current flow in the windings 29—32 in the manner indicated in Fig. 1.

While I have shown my invention in a plurality of forms, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. In a booster rotary converter system, the combination with a rotary converter provided with a coupled booster machine and with commutating field poles, of means for producing a magnetic field proportional to the load current of said rotary converter, means for producing a substantially constant magnetic field, means for producing a magnetic field proportional to the excitation of said booster machine, and means operated by the interaction of said different magnetic fields for adjusting the excitation of said commutating field poles.

2. In a booster rotary converter system, the combination with a rotary converter provided with a coupled booster machine and with commutating field poles, of means for producing a magnetic field proportional to the load current of said rotary converter, means for producing a substantially constant magnetic field, means for producing a magnetic field proportional to the excitation of said booster machine both in direction and magnitude, and means operated by the interaction of said different magnetic fields for adjusting the excitation of said commutating field poles.

3. The combination with a rotary converter provided with a commutating pole, and with a coupled booster machine having a field winding, of energizing means for said commutating pole, a multi-winding torque motor arranged to control the excitation of said energizing means, shunt-type connections from one of said torque-motor windings to terminals of said booster field winding, whereby said winding is excited in proportion to the booster field applied voltage, and series-type connections from another torque motor winding to the load circuit, whereby said winding is energized in proportion to the rotary converter load current.

4. The combination with a rotary converter provided with commutating poles having field windings and with a coupled booster machine having a field winding, of energizing means for said commutating field windings, a three-winding torque motor arranged to control the excitation of said commutating field windings, shunt-type connections from one of said torque-motor windings to terminals of said booster-field winding, whereby said torque-motor winding is energized in proportion to the booster-field applied voltage, series-type connections from another torque-motor winding to the load circuit, whereby said winding is energized in proportion to the rotary-converter load current, and connections whereby the remaining torque-motor winding is energized in substantial proportion to the output voltage of said rotary converter, whereby the resultant excitation of said commutating poles is substantially proportional to the resultant commutating electromotive force thereunder.

In testimony whereof, I have hereunto subscribed my name this 26 day of September, 1916.

JAN ARTHUR KUYSER.

Copies of this patent may be obtained for five cents each, by addressing the "Commissioner of Patents, Washington, D. C."